(12) United States Patent
Ohtomo et al.

(10) Patent No.: US 10,193,185 B2
(45) Date of Patent: Jan. 29, 2019

(54) SULFIDE SOLID ELECTROLYTE MATERIAL AND LITHIUM SOLID STATE BATTERY

(71) Applicant: TOYOTA JIDOSHA KABUSHIKI KAISHA, Toyota-shi, Aichi (JP)

(72) Inventors: Takamasa Ohtomo, Toyota (JP); Koji Kawamoto, Toyota (JP); Shigenori Hama, Toyota (JP); Yasushi Tsuchida, Toyota (JP); Yuki Kato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 427 days.

(21) Appl. No.: 14/876,379

(22) Filed: Oct. 6, 2015

(65) Prior Publication Data

US 2016/0028109 A1   Jan. 28, 2016

Related U.S. Application Data

(63) Continuation of application No. 13/818,495, filed as application No. PCT/JP2011/066174 on Jul. 11, 2011, now Pat. No. 9,356,315.

(30) Foreign Application Priority Data

Aug. 26, 2010 (JP) ................................ 2010-189965

(51) Int. Cl.
*H01M 10/0562* (2010.01)
*H01M 10/0525* (2010.01)
*H01M 10/052* (2010.01)

(52) U.S. Cl.
CPC ..... *H01M 10/0562* (2013.01); *H01M 10/052* (2013.01); *H01M 10/0525* (2013.01);
(Continued)

(58) Field of Classification Search
CPC .......... H01M 10/0562; H01M 10/052; H01M 10/0525; H01M 2300/0065; H01M 2300/008; H01M 2300/0068
See application file for complete search history.

(56) References Cited

U.S. PATENT DOCUMENTS 4,599,284 A   7/1986 Akridge
5,217,826 A   6/1993 Yamamura et al.
(Continued)

FOREIGN PATENT DOCUMENTS

CN   1790780 A   6/2006
EP   0618632 A1   10/1994
(Continued)

OTHER PUBLICATIONS

Ohtomo, Takamasa, et al. "Electrical and Electrochemical Properties of Li2S—P2S5—P2O5 Glass-Ceramic Electrolytes". Journal of Power Sources 146, 2005, pp. 715-718.
(Continued)

*Primary Examiner* — Ula C Ruddock
*Assistant Examiner* — Matthew W Van Oudenaren
(74) *Attorney, Agent, or Firm* — Oliff PLC (57) ABSTRACT

The main object of the present invention is to provide a sulfide solid electrolyte material with high Li ion conductivity. The present invention solves the problem by providing a sulfide solid electrolyte material comprising an ion conductor with an ortho-composition, and LiI, characterized in that the sulfide solid electrolyte material is glass with a glass transition point.

5 Claims, 5 Drawing Sheets

(52) U.S. Cl.
CPC ............... *H01M 2300/008* (2013.01); *H01M 2300/0065* (2013.01); *H01M 2300/0068* (2013.01); *Y02E 60/122* (2013.01)

(56) References Cited

U.S. PATENT DOCUMENTS

| | | |
|---|---|---|
| 6,322,929 B1 | 11/2001 | Takada et al. |
| 6,428,935 B1 | 8/2002 | Takada et al. |
| 2006/0147806 A1 | 7/2006 | Kugai et al. |
| 2007/0160911 A1 | 7/2007 | Senga et al. |
| 2008/0081257 A1 | 4/2008 | Yoshida et al. |
| 2010/0297479 A1 | 11/2010 | Tsuchida et al. |
| 2011/0108642 A1 | 5/2011 | Hama et al. |
| 2011/0167625 A1 | 7/2011 | Hama et al. |
| 2013/0164631 A1 | 6/2013 | Ohtomo et al. |

FOREIGN PATENT DOCUMENTS

| | | |
|---|---|---|
| JP | S59-73850 A | 4/1984 |
| JP | S59-073851 A | 4/1984 |
| JP | 59-151770 A | 8/1984 |
| JP | S62-82665 A | 4/1987 |
| JP | 5-306117 A | 11/1993 |
| JP | H05-310417 A | 11/1993 |
| JP | 6-70905 A | 3/1994 |
| JP | H11-219722 A | 8/1999 |
| JP | 2001-328816 A | 11/2001 |
| JP | 2002-109955 A | 4/2002 |
| JP | 2002-329524 A | 11/2002 |
| JP | 2003-206111 A | 7/2003 |
| JP | 2003-217663 A | 7/2003 |
| JP | 2004-265685 A | 9/2004 |
| JP | 2005-228570 A | 8/2005 |
| JP | 2009-193727 A | 8/2009 |
| JP | 2009-193802 A | 8/2009 |
| JP | 2009-283344 A | 12/2009 |
| JP | 2010-040511 A | 2/2010 |
| WO | 00/28608 A1 | 5/2000 |
| WO | 2010/038313 A1 | 4/2010 |

OTHER PUBLICATIONS

Minami, Keiichi, et al. "Structure and Properties of the 70Li2S—(30–x) P2S5—xP2O5 Oxysulfide Glasses and Glass-Ceramics". Journal of Non-Crystalline Solids 354, 2008, pp. 370-373.

Minami, Keiichi, et al. "Electrical and Electrochemical Properties of the 70Li2S—(30–x) P2S5—xP2O5 Glass-Ceramic Electrolytes". Solid State Ionics 179, 2008, pp. 1282-1285.

Takada, Kazunori, et al. "Lithium Ion Conductive Oxysulfide, Li3PO4—Li3PS4". Solid State Ionics 176, 2005, pp. 2355-2359.

Nov. 10, 2015 Notice of Allowance issued in U.S. Appl. No. 13/818,495.

Ohtomo, Takamasa et al. "Characteristics of the Li2O—Li2S—P2S5 Glasses Synthesized by the Two-Step Mechanical Milling". Journal of Non-Crystalline Solids, vol. 364, 2013, pp. 57-61.

May 21, 2015 Office Action issued in U.S. Appl. No. 13/516,496.

Machida Nobuya et al. "Mechano-chemical Synthesis of Lithium Ion Conducting Materials in the System Li2O—Li2S—P2S5". J. Jpn. Soc. Powder Powder Metallurgy, vol. 51, No. 2, Dec. 12, 2003, pp. 91-97.

Visco et al., "Complex Plane and Li Nmr Studies of Highly Conductive Sulfide-Based Lithium Glasses," Journal of the Eletrochemical Society, Apr. 1985, vol. 132, No. 4, pp. 751-753.

Mizuno et al., "Structure and Ionic Conductivity of Li2S—P2S5—P2O5 Glasses and Glass-Ceramics Prepared by Mechanical Milling," Journal of the Ceramic Society of Japan, 2004, Supplement 112-1, pp. S709-S712.

Jul. 7, 2014 Office Action issued in U.S. Appl. No. 13/516,496.

Oct. 24, 2014 Office Action issued in U.S. Appl. No. 13/516,496.

Ménétrier et al; "Ionic conduction in B2S3—Li2S—LiI glasses;" Solid State Ionics; 1992; vol. 53-56; pp. 1208-1213.

Rao et al; "Oxysulfide glasses xLi2O-(1–x)(0.6Li2S-0.4P2S5);" Journal of Power Sources; 2006; vol. 159; pp. 258-262.

Tomei et al; "Preparation of Amorphous Materials in the system LiI—Li2S—P2S5 by Mechanical Milling and Their Lithium Ion Conducting Properties;" Summary of 29th Solid State Ionics Symposium; 2003; pp. 26-27.

Hayashi et al.; "Preparation of Li2S—P2S5 Amorphous Solid Electrolytes by Mechanical Milling;" J. Am. Ceram. Soc.; 2001; vol. 84; No. 2; pp. 477-479.

Tatsumisago et al; "New lithium ion conducting glass-ceramics prepared from mechanochemical Li2S—P2S5 gasses;" Solid State Ionics; 2002; vol. 154-155; pp. 635-640.

Suh et al; 11B NMR studies of the local environment of boron in B2S3—Li2S—LiI glasses; Journal of Non-Crystalline Solids; 1991; vol. 128; pp. 13-17.

Tatsumisago et al., "Lithium Ion Dendosei Kesshoka Glass (Lithium Ion Conductive Crystallized Glass)," Ceramics, 2008, vol. 43, No. 12, pp. 1051-1054.

Adachi et al., "Lithium Ion Dendotai to Sono Ouyou (Lithium Ion Conductor and its Application)," Ceramics, 1992, vol. 27, No. 2, pp. 117-121.

"21-Seiki no Lithium Nijidenchi Gijyutsu (Lithium Secondary Battery Technology in 21st Century)," Jan. 2002, pp. 182-184.

Ujiie et al., "Structure, ionic conductivity and electrochemical stability of Li2S—P2S5—LiI-glass and glass-ceramic electrolytes," Solid State Ionics, 2012, vol. 211, pp. 42-45.

Ujiie et al., "Preparation and ionic conductivity of (100–x) (0.8Li2S-0.2P2S5)-xLiI glass-ceramic electrolytes," Journal of Solid State Electrochemistry, Oct. 2012.

Partial Translation of Tomei et al.; "Preparation of Amorphous Materials in the system LiI—Li2S—P2S5 by Mechanical Milling and Their Lithium Ion Conducting Properties;" Summary of Solid State Ionics Symposium; vol. 23; 2003; pp. 26-27.

Mercier et al.; "Superionic Conduction in Li2S—P2S5—LiI—Glasses;" Solid State Ionics; vol. 5; 1981; pp. 663-666.

Takada et al.; "Solid-state lithium battery with graphite anode;" Solid State Ionics; vol. 158; 2003; pp. 269-274.

Sep. 14, 2016 Office Action issued in U.S. Appl. No. 13/516,496.

Feb. 1, 2016 Notice of Allowance issued in U.S. Appl. No. 13/818,495.

Feb. 21, 2018 Notice of Allowance issued in U.S. Appl. No. 13/516,496.

Oct. 21, 2015 Advisory Action issued in U.S. Appl. No. 13/516,496.

SULFIDE SOLID ELECTROLYTE MATERIAL AND LITHIUM SOLID STATE BATTERY

This is a Continuation of application Ser. No. 13/818,495 filed Mar. 15, 2013, which in turn is a National Phase of International Patent Application No. PCT/JP2011/066174 filed Jul. 11, 2011, which claims the benefit of Japanese Patent Application No. 2010-189965 filed Aug. 26, 2010. The disclosure of the prior applications are hereby incorporated by reference herein in their entireties.

TECHNICAL FIELD

The present invention relates to a sulfide solid electrolyte material with high Li ion conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, a sulfide solid electrolyte material has been known as a solid electrolyte material used for such a solid electrolyte layer.

The sulfide solid electrolyte material is so high in Li ion conductivity as to be useful for intending higher output of a battery, and various kinds of research have been conventionally made. For example, in Non Patent Literature 1, an LiI—$Li_2S$—$P_2S_5$-based amorphous material obtained by a mechanical milling method is disclosed. In Non Patent Literature 2, an LiI—$Li_2S$—$P_2S_5$-based amorphous material obtained by a mechanical milling method is disclosed. In Non Patent Literature 3, it is disclosed that an LiI—$Li_2S$—$P_2S_5$-based sulfide solid electrolyte material is used for the anode side and another solid electrolyte material is used for the cathode side.

Also, in Patent Literature 1, $Li_2S$—$P_2S_5$-based lithium ion conductor crystal glass and a battery using this as a solid electrolyte are disclosed. In Patent Literature 2, in order to restrain a reaction of a cathode active material and a solid electrolyte, a nonaqueous electrolyte battery selecting a combination of the solid electrolytes for a specific combination is disclosed.

CITATION LIST

Patent Literature

Patent Literature 1: Japanese Patent Application Publication No. 2005-228570

Patent Literature 2: Japanese Patent Application Publication No. 2003-217663

Non Patent Literature

Non Patent literature 1: Naoko Tomei, two others, "Preparation of Amorphous Materials in the system LiI—$Li_2S$—$P_2S_5$ by Mechanical Milling and Their Lithium Ion Conducting Properties", Summary of Solid State Ionics Symposium, Vol. 23 (2003), P. 26-27

Non Patent Literature 2: Rene Mercier et al., "SUPERIONIC CONDUCTION IN $Li_2S$—$P_2S_5$—LiI-GLASSES", Solid State Ionics 5 (1981), 663-666

Non Patent Literature 3: Kazunori Takada et al., "Solid-state lithium battery with graphite anode", Solid State Ionics 158 (2003), 269-274

SUMMARY OF INVENTION

Technical Problem

A sulfide solid electrolyte material with high Li ion conductivity has been conventionally demanded. The present invention has been made in view of the above-mentioned actual circumstances, and the main object thereof is to provide a sulfide solid electrolyte material with high Li ion conductivity.

Solution to Problem

In a present invention, to solve the above-mentioned problem, there is provided a sulfide solid electrolyte material comprising an ion conductor with an ortho-composition, and LiI, characterized in that the sulfide solid electrolyte material is glass with a glass transition point.

The present invention allows a sulfide solid electrolyte material with high Li ion conductivity by reason of comprising LiI (LiI component) to become rich in Li. In addition, this sulfide solid electrolyte material is so high in amorphous nature as has a glass transition point as to allow Li ion conductivity to be improved.

In the above-mentioned invention, a content of the LiI is preferably within a range of 10 mol % to 30 mol %.

In the above-mentioned invention, the ion conductor preferably contains Li, X (X is P, Si, Ge, Al or B), and S. The reason therefor is to allow a sulfide solid electrolyte material with high Li ion conductivity.

In the above-mentioned invention, the ion conductor preferably contains Li, P, and S.

Furthermore, in the present invention, there is provided a sulfide solid electrolyte material comprising an ion conductor with an ortho-composition, and LiI, characterized in that the ion conductor contains oxygen.

The present invention allows a sulfide solid electrolyte material with high Li ion conductivity by reason of comprising LiI (LiI component) to become rich in Li. In addition, this sulfide solid electrolyte material may restrain chemical stability from deteriorating due to the influence of LiI for the reason that the above-mentioned ion conductor contains oxygen.

In the above-mentioned invention, the oxygen of the ion conductor is preferably derived from $Li_2O$. The reason therefor is to introduce oxygen easily.

In the above-mentioned invention, the ion conductor preferably contains Li, X (X is P, Si, Ge, Al or B), S, and O. The reason therefor is to allow a sulfide solid electrolyte material with high Li ion conductivity.

In the above-mentioned invention, the ion conductor preferably contains Li, P, S, and O.

Furthermore, in the present invention, there is provided a lithium solid state battery comprising a cathode active material layer containing a cathode active material, an anode active material layer containing an anode active material, and a solid electrolyte layer formed between the cathode active material layer and the anode active material layer, characterized in that the cathode active material layer contains the cathode active material with an electric potential of 2.8 V (vs Li) or more, and a sulfide solid electrolyte material comprising an ion conductor with an ortho-composition and LiI.

The present invention allows a high-output lithium solid state battery for the reason that a cathode active material layer contains a sulfide solid electrolyte material comprising LiI (LiI component).

In the above-mentioned invention, the ion conductor preferably contains Li, X (X is P, Si, Ge, Al or B), and S. The reason therefor is to allow a sulfide solid electrolyte material with high Li ion conductivity.

In the above-mentioned invention, the ion conductor preferably contains Li, P, and S.

Furthermore, in the present invention, there is provided a lithium solid state battery comprising a cathode active material layer containing a cathode active material, an anode active material layer containing an anode active material, and a solid electrolyte layer formed between the cathode active material layer and the anode active material layer, characterized in that at least one of the cathode active material layer, the anode active material layer and the solid electrolyte layer contains the sulfide solid electrolyte material.

The present invention allows a high-output lithium solid state battery by reason of containing a sulfide solid electrolyte material comprising LiI (LiI component). In addition, the above-mentioned sulfide solid electrolyte material may restrain chemical stability from deteriorating due to the influence of LiI by reason of containing an ion conductor containing oxygen (O). As a result, the present invention allows a lithium solid state battery which restrains reaction resistance from increasing.

In the above-mentioned invention, the cathode active material layer preferably contains the cathode active material with an electric potential of 2.8 V (vs Li) or more, and the sulfide solid electrolyte material.

Advantageous Effects of Invention

The present invention produces the effect such as to allow a sulfide solid electrolyte material with high Li ion conductivity.

DESCRIPTION OF EMBODIMENTS

A sulfide solid electrolyte material and a lithium solid state battery of the present invention are hereinafter described in detail.

A. Sulfide Solid Electrolyte Material

A sulfide solid electrolyte material of the present invention is first described. The sulfide solid electrolyte material of the present invention may be roughly divided into two embodiments. The sulfide solid electrolyte material of the present invention is hereinafter described while divided into a first embodiment and a second embodiment.

1. First Embodiment

The sulfide solid electrolyte material of a first embodiment is a sulfide solid electrolyte material comprising an ion conductor with an ortho-composition, and LiI, characterized in that the sulfide solid electrolyte material is glass with a glass transition point.

The first embodiment allows a sulfide solid electrolyte material with high Li ion conductivity by reason of comprising LiI (LiI component) to become rich in Li. In addition, the sulfide solid electrolyte material of the first embodiment is so high in amorphous nature as has a glass transition point as to allow Li ion conductivity to be improved. Also, the first embodiment allows a sulfide solid electrolyte material which has resistance to deterioration (such as oxidative decomposition) for the reason that the above-mentioned ion conductor has an ortho-composition.

Figure 1:
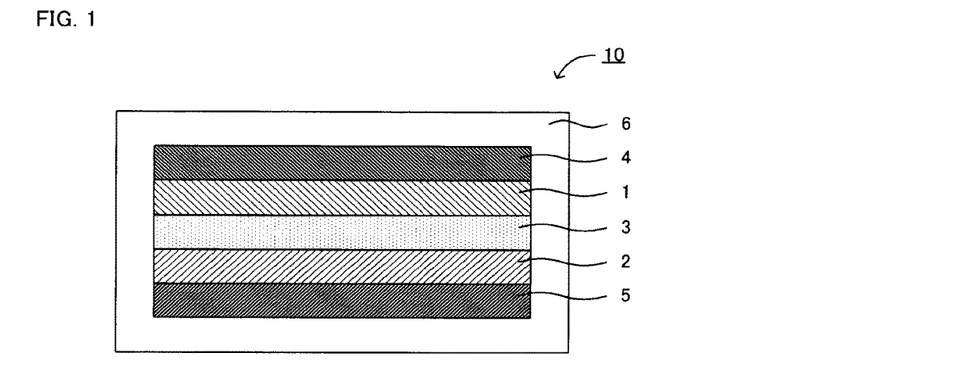
FIG. 1 is a schematic cross-sectional view showing an example of a lithium solid state battery of the present invention.

An $xLiI.75Li_2S.25P_2S_5$-based amorphous material (amorphous substance) is described in FIG. 1 of the Non Patent Literature 1. This amorphous substance has an ion conductor with an ortho-composition of $75Li_2S.25P_2S_5$ and LiI. However, an amorphous substance ordinarily signifies an amorphous substance such that periodicity as a crystal is not observed in measuring X-ray diffraction or the like, and the amorphous nature exhibited by an amorphous substance ranges to a degree. Therefore, an amorphous substance with high amorphous nature and an amorphous substance with low amorphous nature exist among amorphous substances. Here, even though the synthesis of an amorphous substance by a mechanical milling method is described in Non Patent Literature 1, the details thereof are not clear and not specifically described, so that it is surmised that the mechanical milling method is a general dry-type mechanical milling.

As described in the after-mentioned Comparative Example 1-3, dry-type mechanical milling does not allow a glassy sulfide solid electrolyte material having a glass transition point. It is probably conceived with regard to dry-type mechanical milling that the reason therefor is that a raw material composition anchors on a wall surface of a vessel to be sufficiently amorphized with difficulty. On the contrary, the sulfide solid electrolyte material of the first embodiment may be obtained by performing wet-type mechanical milling as described later. In wet-type mechanical milling, a raw material composition may be prevented from anchoring on a wall surface of a vessel and may be sufficiently amorphized. Therefore, a solid electrolyte material with as high amorphous nature as has a glass transition point is allowed. Glass in a strict sense signifies glass such as to be an amorphous substance and have an observable glass transition point. Also, in Non Patent Literature 1, the word amorphous is used but the word glass is not used. In the case of comparing glass with an amorphous substance except glass, an index for determining which is higher in Li ion conductivity does not exist generally.

(1) Sulfide Solid Electrolyte Material

The sulfide solid electrolyte material of the first embodiment is greatly characterized by being glass with a glass transition point. The presence or absence of a glass transition point may be confirmed by differential thermal analysis (DTA). It may be determined by X-ray diffraction (XRD) measurement using a CuKα ray that the sulfide solid electrolyte material is an amorphous substance.

The sulfide solid electrolyte material of the first embodiment is characterized by comprising an ion conductor with an ortho-composition, and LiI. The above-mentioned sulfide solid electrolyte material is glass, so that LiI ordinarily exists in a state of being incorporated into the structure of an ion conductor with an ortho-composition. Therefore, it is preferable that the above-mentioned sulfide solid electrolyte material does not have a peak of LiI in XRD measurement using a CuKα ray. The peak of LiI ordinarily appears at 2θ=26°, 30°, 43° and 51°. The content of the above-mentioned LiI is not particularly limited if it is a ratio for allowing glass with a glass transition point; for example, preferably 34 mol % or less, more preferably 30 mol % or less. On the other hand, the content of the above-mentioned LiI is, for example, preferably 1 mol % or more, more preferably 5 mol % or more, and far more preferably 10 mol % or more. The reason therefor is that too small content of the LiI brings a possibility of not contributing to the improvement of Li ion conductivity.

The above-mentioned ion conductor has an ortho-composition. Here, ortho generally signifies oxo acid which is the highest in degree of hydration among oxo acids obtained by hydrating the same oxide. In the first embodiment, a crystal composition to which $Li_2S$ (and $Li_2O$) is added most among sulfides is called an ortho-composition. For example, $Li_3PS_4$ corresponds to an ortho-composition in the $Li_2S$—$P_2S_5$ system, $Li_3AlS_3$ corresponds to an ortho-composition in the $Li_2S$—$Al_2S_3$ system, $Li_3BS_3$ corresponds to an ortho-composition in the $Li_2S$—$B_2S_3$ system, $Li_4SiS_4$ corresponds to an ortho-composition in the $Li_2S$—$SiS_2$ system, and $Li_4GeS_4$ corresponds to an ortho-composition in the $Li_2S$—$GeS_2$ system. In the first embodiment, part of sulfur (S) in the above-mentioned ortho-composition may be substituted with oxygen (O).

Also, in the first embodiment, "having an ortho-composition" means including not merely a strict ortho-composition but also a composition in the neighborhood thereof. Specifically, "having an ortho-composition" signifies that an anion structure in an ortho-composition ($PS_4^{3-}$ structure, $SiS_4^{4-}$ structure, $GeS_4^{4-}$ structure, $AlS_3^{3-}$ structure and $BS_3^{3-}$ structure) is the main component. The ratio of an anion structure in an ortho-composition is preferably 60 mol % or more, more preferably 70 mol % or more, far more preferably 80 mol % or more, and particularly preferably 90 mol % or more with respect to all anion structures in the ion conductor. The ratio of an anion structure in an ortho-composition may be determined by Raman spectroscopy, NMR, XPS or the like.

The composition of the above-mentioned ion conductor is not particularly limited, preferably containing Li, X (X is P, Si, Ge, Al or B), and S. The reason therefor is to allow a sulfide solid electrolyte material with high Li ion conductivity. The above-mentioned X is particularly preferably P. Also, the above-mentioned X may contain the above-mentioned element by two kinds or more.

The sulfide solid electrolyte material of the first embodiment is preferably obtained by amorphizing a raw material composition containing $Li_2S$, sulfide of X (X is P, Si, Ge, Al or B), and LiI.

$Li_2S$ contained in a raw material composition preferably has fewer impurities. The reason therefor is to allow a side reaction to be restrained. Examples of a synthesis method for $Li_2S$ include a method described in Japanese Patent Application Publication No. H07-330312. In addition, $Li_2S$ is preferably purified by using a method described in WO2005/040039. On the other hand, examples of sulfide of the above-mentioned X contained in a raw material composition include $P_2S_3$, $P_2S_5$, $SiS_2$, $GeS_2$, $Al_2S_3$ and $B_2S_3$.

It is preferable that the above-mentioned sulfide solid electrolyte material does not substantially contain $Li_2S$. The reason therefor is to allow a sulfide solid electrolyte material with less hydrogen sulfide generation amount. $Li_2S$ reacts with water to generate hydrogen sulfide. For example, a larger ratio of $Li_2S$ contained in a raw material composition survives $Li_2S$ more easily. The phrase "does not substantially contain $Li_2S$" may be confirmed by X-ray diffraction. Specifically, in the case of not having a peak of $Li_2S$ (2θ=27.0°, 31.2°, 44.8° and) 53.1°, "does not substantially contain $Li_2S$" may be determined.

It is preferable that the above-mentioned sulfide solid electrolyte material does not substantially contain cross-linking sulfur. The reason therefor is to allow a sulfide sol id electrolyte material with less hydrogen sulfide generation amount. The term "cross-linking sulfur" signifies cross-linking sulfur in a compound obtained by a reaction of $Li_2S$ and sulfide of the above-mentioned X. For example, cross-linking sulfur with an $S_3P$—S—$PS_3$ structure obtained by a reaction of $Li_2S$ and $P_2S_5$ corresponds thereto. Such cross-linking sulfur reacts easily with water to easily generate hydrogen sulfide. In addition, "does not substantially contain cross-linking sulfur" may be confirmed by measuring Raman spectroscopy. For example, in the case of an $Li_2S$—$P_2S_5$-based sulfide solid electrolyte material, a peak of an $S_3P$—S—$PS_3$ structure ordinarily appears at 402 $cm^{-1}$. Therefore, it is preferable that this peak is not detected. A peak of a $PS_4^{3-}$ structure ordinarily appears at 417 $cm^{-1}$. In the first embodiment, the intensity $I_{402}$ at 402 $cm^{-1}$ is preferably smaller than the intensity $I_{417}$ at 417 $cm^{-1}$. More specifically, the intensity $I_{402}$ is, for example, preferably 70% or less, more preferably 50% or less, and far more preferably 35% or less with respect to the intensity $I_{417}$. Also, with regard to a sulfide solid electrolyte material except $Li_2S$—$P_2S_5$-based, "does not substantially contain cross-linking sulfur" may be determined by specifying a unit containing cross-linking sulfur to measure a peak of the unit.

Also, in the case of an $Li_2S$—$P_2S_5$-based sulfide solid electrolyte material, the ratio of $Li_2S$ and $P_2S_5$ for allowing an ortho-composition is $Li_2S:P_2S_5=75:25$ on a molar basis. The case of an $Li_2S$—$Al_2S_3$-based sulfide solid electrolyte material and the case of an $Li_2S$—$B_2S_3$-based sulfide solid electrolyte material are similar thereto. On the other hand, in the case of an $Li_2S$—$SiS_2$-based sulfide solid electrolyte material, the ratio of $Li_2S$ and $SiS_2$ for allowing an ortho-composition is $Li_2S:SiS_2=66.7:33.3$ on a molar basis. The case of an $Li_2S$—$GeS_2$-based sulfide solid electrolyte material is similar thereto.

In the case where the above-mentioned raw material composition contains $Li_2S$ and $P_2S_5$, the ratio of $Li_2S$ to the total of $Li_2S$ and $P_2S_5$ is preferably within a range of 70 mol % to 80 mol %, more preferably within a range of 72 mol % to 78 mol %, and far more preferably within a range of 74 mol % to 76 mol %. The case where the above-mentioned raw material composition contains $Li_2S$ and $Al_2S_3$ and the case where the above-mentioned raw material composition contains $Li_2S$ and $B_2S_3$ are similar thereto. On the other hand, in the case where the above-mentioned raw material composition contains $Li_2S$ and $SiS_2$, the ratio of $Li_2S$ to the total of $Li_2S$ and $SiS_2$ is preferably within a range of 62.5 mol % to 70.9 mol %, more preferably within a range of 63 mol % to 70 mol %, and far more preferably within a range of 64 mol % to 68 mol %. The case where the above-mentioned raw material composition contains $Li_2S$ and $GeS_2$ is similar thereto.

Examples of the shape of a sulfide solid electrolyte material of the first embodiment include a particulate. The average particle diameter of a particulate sulfide solid electrolyte material is, for example, preferably within a range of 0.1 μm to 50 μm. The above-mentioned sulfide solid electrolyte material is preferably high in Li ion conductivity, and Li ion conductivity at normal temperature is, for example, preferably $1 \times 10^{-4}$ S/cm or more, and more preferably $1 \times 10^{-3}$ S/cm or more.

A sulfide solid electrolyte material of the first embodiment may be used for optional uses in which Li ion conductivity is required. Above all, the above-mentioned sulfide solid electrolyte material is preferably used for a battery. In addition, in the case where the above-mentioned sulfide solid electrolyte material is used for a battery, it may be used for a cathode active material layer (a cathode body), an anode active material layer (an anode body) or an electrolyte layer.

(2) Producing Method for Sulfide Solid Electrolyte Material

Next, a producing method for a sulfide solid electrolyte material of the first embodiment is described. The producing method for a sulfide solid electrolyte material of the first embodiment is not particularly limited if it is a method for obtaining the above-mentioned sulfide solid electrolyte material. Examples of the producing method for the above-mentioned sulfide solid electrolyte material include a producing method having synthesis step of amorphizing a raw material composition containing $Li_2S$, sulfide of X (X is P, Si, Ge, Al or B), and LiI by wet-type mechanical milling.

The mechanical milling is not particularly limited if it is a method for mixing a raw material composition while allowing mechanical energy thereto; examples thereof include ball mill, vibrating mill, turbo mill, mechano-fusion and disk mill, and ball mill is preferable among them and planetary ball mill is particularly preferable. The reason therefor is to efficiently obtain a desired sulfide solid electrolyte material.

Various kinds of the conditions of the mechanical milling are determined so as to obtain a desired sulfide solid electrolyte material. For example, in the case of using planetary ball mill, a raw material composition and a grinding ball are added and treated at predetermined number of revolutions and time. Generally, larger number of revolutions brings higher production rate of a sulfide solid electrolyte material, and longer treating time brings higher conversion ratio of a raw material composition into a sulfide solid electrolyte material. The number of weighing table revolutions in performing planetary ball mill is preferably within a range of 200 rpm to 500 rpm, for example, and within a range of 250 rpm to 400 rpm, above all. The treating time in performing planetary ball mill is preferably within a range of 1 hour to 100 hours, for example, and within a range of 1 hour to 50 hours, above all.

Liquid used for wet-type mechanical milling is preferably such as to have properties for not generating hydrogen sulfide in a reaction with the above-mentioned raw material composition. Hydrogen sulfide is generated in such a manner that a proton dissociated from a molecule of the liquid reacts with a raw material composition and a sulfide solid electrolyte material. Therefore, the above-mentioned liquid preferably has such aprotic properties as not to generate hydrogen sulfide. Ordinarily, aprotic liquid may be roughly divided into polar aprotic liquid and nonpolar aprotic liquid.

The polar aprotic liquid is not particularly limited; examples thereof include ketones such as acetone; nitriles such as acetonitrile; amides such as N,N-dimethylformamide (DMF); and sulfoxides such as dimethyl sulfoxide (DMSO).

Examples of the nonpolar aprotic liquid include alkane which is liquid at normal temperature (25° C.). The above-mentioned alkane may be chain alkane or cyclic alkane. The carbon number of the above-mentioned chain alkane is preferably 5 or more, for example. On the other hand, the upper limit of the carbon number of the above-mentioned chain alkane is not particularly limited if it is liquid at normal temperature. Specific examples of the above-mentioned chain alkane include pentane, hexane, heptane, octane, nonane, decane, undecane, dodecane and paraffin. The above-mentioned chain alkane may have a branch. On the other hand, specific examples of the above-mentioned cyclic alkane include cyclopentane, cyclohexane, cycloheptane, cyclooctane and cycloparaffin.

Other examples of the nonpolar aprotic liquid include aromatic hydrocarbons such as benzene, toluene and xylene; chain ethers such as diethyl ether and dimethyl ether; cyclic ethers such as tetrahydrofuran; alkyl halides such as chloroform, methyl chloride and methylene chloride; esters such as ethyl acetate; and fluorine-based compounds such as benzene fluoride, heptane fluoride, 2,3-dihydroperfluoropentane and 1,1,2,2,3,3,4-heptafluorocyclopentane. The added amount of the above-mentioned liquid is not particularly limited and may be such amount as to obtain a desired sulfide solid electrolyte material.

2. Second Embodiment

Next, a second embodiment of a sulfide solid electrolyte material of the present invention is described. The sulfide solid electrolyte material of the second embodiment is a sulfide solid electrolyte material comprising an ion conductor with an ortho-composition, and LiI, characterized in that the above-mentioned ion conductor contains oxygen (O).

The second embodiment allows a sulfide solid electrolyte material with high Li ion conductivity by reason of comprising LiI (LiI component) to become rich in Li. In addition, the sulfide solid electrolyte material of the second embodiment may restrain chemical stability from deteriorating due to the influence of LiI for the reason that the above-mentioned ion conductor contains oxygen (O). Also, the second embodiment allows a sulfide solid electrolyte material which has resistance to deterioration (such as oxidative decomposition) for the reason that the above-mentioned ion conductor has an ortho-composition. The sulfide solid electrolyte material of the second embodiment differs from the above-mentioned sulfide solid electrolyte material of the first embodiment, and may be glass, an amorphous substance except glass, a crystalline substance or a substance which is completely crystalline.

(1) Sulfide Solid Electrolyte Material

The sulfide solid electrolyte material of the second embodiment is greatly characterized in that the ion conductor with an ortho-composition contains oxygen (O). Ordinarily, O contained in the above-mentioned ion conductor exists in a position of S in an anion structure (such as $PS_4^{3-}$ structure) of an ortho-composition consisting essentially of S. Specific examples thereof include $PS_3O^{3-}$, $PS_2O_2^{3-}$ and $PSO_3^{3-}$. It may be confirmed by NMR, Raman spectroscopy, XPS or the like that the above-mentioned ion conductor contains O. In particular, in the case where the ion conductor contains P, it is preferable to measure by $^{31}P$ MAS NMR. Oxygen in the above-mentioned ion conductor is preferably derived from an oxygen-containing compound and more preferably derived from $Li_2O$. The reason therefor is to allow a sulfide solid electrolyte material with high chemical stability.

The sulfide solid electrolyte material of the second embodiment is characterized by comprising an ion conductor with an ortho-composition, and LiI. In the second embodiment, at least part of LiI preferably exists in a state of being incorporated into the structure of an ion conductor with an ortho-composition. The content of the above-mentioned LiI is not particularly limited; for example, preferably within a range of 1 mol % to 60 mol %, more preferably within a range of 5 mol % to 50 mol %, and far more preferably within a range of 10 mol % to 40 mol %.

The above-mentioned ion conductor has an ortho-composition. As described above, $Li_3PS_4$ corresponds to an ortho-composition in the $Li_2S$—$P_2S_5$ system, $Li_3AlS_3$ corresponds to an ortho-composition in the $Li_2S$—$Al_2S_3$ system, $Li_3BS_3$ corresponds to an ortho-composition in the $Li_2S$—$B_2S_3$ system, $Li_4SiS_4$ corresponds to an ortho-composition in the $Li_2S$—$SiS_2$ system, and $Li_4GeS_4$ corresponds to an ortho-composition in the $Li_2S$—$GeS_2$ system. In the second embodiment, part of sulfur (S) in the above-mentioned ortho-composition is substituted with oxygen (O).

The composition of the above-mentioned ion conductor is not particularly limited, preferably containing Li, X (X is P, Si, Ge, Al or B), S and O. The reason therefor is to allow a sulfide solid electrolyte material with high Li ion conductivity. The above-mentioned X is particularly preferably P.

The sulfide solid electrolyte material of the second embodiment is preferably obtained by using a raw material composition containing $Li_2S$, $Li_2O$, sulfide of X (X is P, Si, Ge, Al or B), and LiI. $Li_2S$ and sulfide of X contained in a raw material composition are as described above.

Also, in the case of an $Li_2S$—$Li_2O$—$P_2S_5$-based sulfide solid electrolyte material, the ratio of $Li_2S$, $Li_2O$ and $P_2S_5$ for allowing an ortho-composition is $(Li_2S+Li_2O):P_2S_5=75:25$ on a molar basis. The case of an $Li_2S$—$Li_2O$—$Al_2S_3$-based sulfide solid electrolyte material and the case of an $Li_2S$—$Li_2O$—$B_2S_3$-based sulfide solid electrolyte material are similar thereto. On the other hand, in the case of an $Li_2S$—$Li_2O$—$SiS_2$-based sulfide solid electrolyte material, the ratio of $Li_2S$, $Li_2O$ and $SiS_2$ for allowing an ortho-composition is $(Li_2S+Li_2O):SiS_2=66.7:33.3$ on a molar basis. The case of an $Li_2S$—$Li_2O$—$GeS_2$-based sulfide solid electrolyte material is similar thereto.

In the case where the above-mentioned raw material composition contains $Li_2S$, $Li_2O$ and $P_2S_5$, the ratio of $Li_2S$ and $Li_2O$ to the total of $Li_2S$, $Li_2O$ and $P_2S_5$ is preferably within a range of 70 mol % to 80 mol %, more preferably within a range of 72 mol % to 78 mol %, and far more preferably within a range of 74 mol % to 76 mol %. The case where the above-mentioned raw material composition contains $Li_2S$, $Li_2O$ and $Al_2S_3$ and the case where the above-mentioned raw material composition contains $Li_2S$, $Li_2O$ and $B_2S_3$ are similar thereto. On the other hand, in the case where the above-mentioned raw material composition contains $Li_2S$, $Li_2O$ and $SiS_2$, the ratio of $Li_2S$ and $Li_2O$ to the total of $Li_2S$, $Li_2O$ and $SiS_2$ is preferably within a range of 62.5 mol % to 70.9 mol %, more preferably within a range of 63 mol % to 70 mol %, and far more preferably within a range of 64 mol % to 68 mol %. The case where the above-mentioned raw material composition contains $Li_2S$, $Li_2O$ and $GeS_2$ is similar thereto.

The ratio of $Li_2O$ to the total of $Li_2S$ and $Li_2O$ is, for example, preferably within a range of 1 mol % to 40 mol %, more preferably within a range of 4 mol % to 27 mol %. The reason therefor is that too small ratio of the $Li_2O$ brings a possibility of not contributing to the improvement of chemical stability of a sulfide solid electrolyte material, and too high ratio of the $Li_2O$ brings a possibility of greatly deteriorating Li ion conductivity.

The content of $Li_2O$ in a sulfide solid electrolyte material of the second embodiment is, for example, preferably within a range of 1 mol % to 30 mol %, and more preferably within a range of 3 mol % to 20 mol %.

Other items with regard to a sulfide solid electrolyte material of the second embodiment are the same as the items described in the above-mentioned "1. First embodiment"; therefore, the description will not be repeated here.

(2) Producing Method for Sulfide Solid Electrolyte Material

Next, a producing method for a sulfide solid electrolyte material of the second embodiment is described. The producing method for a sulfide solid electrolyte material of the second embodiment is not particularly limited if it is a method for obtaining the above-mentioned sulfide solid electrolyte material. Examples of the producing method for the above-mentioned sulfide solid electrolyte material include a producing method having synthesis step of amorphizing a raw material composition containing $Li_2S$, $Li_2O$, sulfide of X (X is P, Si, Ge, Al or B), and LiI.

Examples of a method for amorphizing include mechanical milling and melt extraction, and mechanical milling is preferable among them. The reason therefor is that treatment at normal temperature can be performed to intend the simplification of production processes. The mechanical milling may be a dry-type mechanical milling or a wet-type mechanical milling, but yet the latter is preferable. The reason therefor is that a raw material composition may be prevented from anchoring on a wall surface of a vessel to obtain a sulfide solid electrolyte material with higher amorphous nature.

Heat-treating step of heat-treating the sulfide solid electrolyte material obtained in the synthesis step may be performed in the above-mentioned producing method. The reason therefor is to obtain a crystalline sulfide solid electrolyte material. The heating temperature is preferably a temperature equal to or higher than crystallizing temperature.

On the other hand, other examples of the above-mentioned producing method for a sulfide solid electrolyte material include a producing method comprising a first amorphizing step of amorphizing a raw material composition containing Li$_2$S, sulfide of X (X is P, Si, Ge, Al or B) and LiI, and a second amorphizing step of amorphizing the material obtained by the above-mentioned first amorphizing step while adding Li$_2$O thereto. The addition of Li$_2$O in the second amorphizing step allows chemical stability of the sulfide solid electrolyte material to be efficiently improved. In the above-mentioned producing method, LiI is added in the first amorphizing step and LiI may be added in the second amorphizing step. In addition, the heat-treating step of heat-treating the sulfide solid electrolyte material obtained in the second amorphizing step may be performed in the above-mentioned producing method.

B. Lithium Solid State Battery

Next, a lithium solid state battery of the present invention is described. The lithium solid state battery of the present invention may be roughly divided into two embodiments. The lithium solid state battery of the present invention is hereinafter described while divided into a first embodiment and a second embodiment.

1. First Embodiment

The lithium solid state battery of the first embodiment is a lithium solid state battery comprising a cathode active material layer containing a cathode active material, an anode active material layer containing an anode active material, and a solid electrolyte layer formed between the cathode active material layer and the anode active material layer, characterized in that the cathode active material layer contains the cathode active material with an electric potential of 2.8 V (vs Li) or more and a sulfide solid electrolyte material comprising anion conductor with an ortho-composition and LiI.

The first embodiment allows a high-output lithium solid state battery for the reason that the cathode active material layer contains a sulfide solid electrolyte material comprising LiI (LiI component). Conventionally, LiI is conceived to decompose in the vicinity of 2.8 V, so that a sulfide solid electrolyte material comprising LiI has not been used for the cathode active material layer. For example, in page 270 of Non Patent Literature 3, it is described that LiI—Li$_2$S—P$_2$S$_5$ may not be combined with a cathode active material such as LiCoO$_2$. Also, in paragraphs [0028] and [0029] of Patent Literature 2, it is described that electric potential at which an oxidation reaction of LiI is caused is so low as to be incapable of being combined with a cathode active material. In addition, according to the Nernst equation, LiI is subject to an oxidation reaction at 2.8 V.

$$E = \Delta U_{elec}/\gamma F = 270.29 \times 10^3 / 1 \times 96450 = 2.8 \text{ V (vs Li)}$$

However, as described in (Verification of oxidative decomposition) of [Evaluation 1] of the after-mentioned examples, it was confirmed that LiI did not decompose unexpectedly even though a sulfide solid electrolyte material comprising LiI was contained in the cathode active material layer. The reason therefor is still unclear and it is conceived that LiI is stabilized by an interaction with the above-mentioned ion conductor.

FIG. 1 is a schematic cross-sectional view showing an example of a lithium solid state battery of the first embodiment. A lithium solid state battery 10 shown in FIG. 1 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. The first embodiment is greatly characterized in that the cathode active material layer 1 contains a cathode active material with an electric potential of 2.8 V (vs Li) or more and a sulfide solid electrolyte material comprising an ion conductor with an ortho-composition, and LiI. In particular, in the first embodiment, the cathode active material layer 1, the anode active material layer 2 and the solid electrolyte layer 3 preferably contain the above-mentioned sulfide solid electrolyte material.

The lithium solid state battery of the first embodiment is hereinafter described in each constitution.

(1) Cathode Active Material Layer

The cathode active material layer in the first embodiment contains a cathode active material with an electric potential of 2.8 V (vs Li) or more and a sulfide solid electrolyte material comprising an ion conductor with an ortho-composition and LiI.

(i) Sulfide Solid Electrolyte Material

A sulfide solid electrolyte material in the first embodiment may be not merely the sulfide solid electrolyte material (glass with a glass transition point) described in the above-mentioned "A. Sulfide solid electrolyte material 1. First embodiment", but also an amorphous substance except glass, a crystalline substance or a substance which is completely crystalline. In the first embodiment, at least part of LiI preferably exists in a state of being incorporated into the structure of an ion conductor with an ortho-composition. The content of the above-mentioned LiI is not particularly limited; for example, preferably within a range of 1 mol % to 60 mol %, more preferably within a range of 5 mol % to 50 mol %, and far more preferably within a range of 10 mol % to 40 mol %. The ion conductor with an ortho-composition is the same as the contents described in the above-mentioned "A. Sulfide solid electrolyte material 1. First embodiment"; therefore, the description will not be repeated here.

The content of the above-mentioned sulfide solid electrolyte material in the cathode active material layer is preferably, for example, within a range of 0.1% by volume to 80% by volume, above all, within a range of 1% by volume to 60% by volume, and particularly, within a range of 10% by volume to 50% by volume.

(ii) Cathode Active Material

A cathode active material in the first embodiment is not particularly limited if it has an electric potential of 2.8 V (vs Li) or more; examples thereof include rock salt bed type active material such as LiCoO$_2$, LiMnO$_2$, LiNiO$_2$, LiVO$_2$ and LiNi$_{1/3}$Co$_{1/3}$Mn$_{1/3}$O$_2$, spinel type active material such as LiMn$_2$O$_4$ and Li(Ni$_{0.5}$Mn$_{1.5}$)O$_4$, and olivine type active material such as LiFePO$_4$, LiMnPO$_4$, LiNiPO$_4$ and LiCuPO$_4$. Also, Si-containing oxides such as Li$_2$FeSiO$_4$ and Li$_2$MnSiO$_4$ may be used as a cathode active material. In addition, the electric potential of a cathode active material is preferably higher, for example, 3.0 V (vs Li) or more.

Examples of the shape of a cathode active material include a particulate shape, preferably a spherical shape or an elliptically spherical shape, above all. In the case where a cathode active material is in a particulate shape, the average particle diameter thereof is, for example, preferably within a range of 0.1 μm to 50 μm. The content of a cathode active material in the cathode active material layer is, for example, preferably within a range of 10% by volume to 99% by volume, and more preferably within a range of 20% by volume to 99% by volume.

(iii) Cathode Active Material Layer

A cathode active material layer in the first embodiment may further contain at least one of a conductive material and a binder in addition to a cathode active material and a sulfide solid electrolyte material. Examples of the conductive material include acetylene black, Ketjen Black and carbon fiber. Examples of the binder include fluorine-containing binders such as PTFE and PVDF. The thickness of the above-mentioned cathode active material layer is, for example, preferably within a range of 0.1 μm to 1000 μm.

(2) Anode Active Material Layer

Next, an anode active material layer in the first embodiment is described. The anode active material layer in the first embodiment is a layer containing at least an anode active material, and may further contain at least one of a solid electrolyte material, a conductive material and a binder as required.

In the first embodiment, a solid electrolyte material contained in the anode active material layer is preferably the sulfide solid electrolyte material described in the above-mentioned "(1) Cathode active material layer (i) Sulfide solid electrolyte material". The reason therefor is to allow a high-output battery. The content of the above-mentioned sulfide solid electrolyte material in the anode active material layer is preferably, for example, within a range of 0.1% by volume to 80% by volume, above all, within a range of 1% by volume to 60% by volume, and particularly, within a range of 10% by volume to 50% by volume.

Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. The content of the anode active material in the anode active material layer is, for example, preferably within a range of 10% by volume to 99% by volume, and more preferably within a range of 20% by volume to 99% by volume. A conductive material and a binder are the same as are used for the above-mentioned cathode active material layer. The thickness of the anode active material layer is preferably within a range of 0.1 μm to 1000 μm, for example.

(3) Solid Electrolyte Layer

Next, a solid electrolyte layer in the first embodiment is described. The solid electrolyte layer in the first embodiment is a layer formed between the cathode active material layer and the anode active material layer, and a layer composed of a solid electrolyte material. The solid electrolyte material contained in the solid electrolyte layer is not particularly limited if it has Li ion conductivity.

In the first embodiment, a solid electrolyte material contained in the solid electrolyte layer is preferably the sulfide solid electrolyte material described in the above-mentioned "(1) Cathode active material layer (i) Sulfide solid electrolyte material". The reason therefor is to allow a high-output battery. The content of the above-mentioned sulfide solid electrolyte material in the solid electrolyte layer is not particularly limited if it is a ratio for obtaining desired insulation properties, and is preferably, for example, within a range of 10% by volume to 100% by volume, above all, within a range of 50% by volume to 100% by volume. In particular, in the first embodiment, the solid electrolyte layer is preferably composed of only the above-mentioned sulfide solid electrolyte material.

The solid electrolyte layer may contain a binder. The reason therefor is that the solid electrolyte layer with flexibility may be obtained by containing a binder. Examples of the binder include fluorine-containing binders such as PTFE and PVDF. The thickness of the solid electrolyte layer is preferably within a range of 0.1 μm to 1000 μm, for example, and within a range of 0.1 μm to 300 μm, above all.

(4) Other Constitutions

A lithium solid state battery of the first embodiment comprises at least the above-mentioned cathode active material layer, anode active material layer and solid electrolyte layer, ordinarily further comprising a cathode current collector for collecting the cathode active material layer and an anode current collector for collecting the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. The thickness and shape of the cathode current collector and the anode current collector are preferably selected properly in accordance with uses of a lithium solid state battery. A battery case of a general lithium solid state battery may be used for a battery case used for the first embodiment. Examples of the battery case include a battery case made of SUS.

(5) Lithium Solid State Battery

A lithium solid state battery of the first embodiment may be a primary battery or a secondary battery, and preferably a secondary battery among them. The reason therefor is to be repeatedly charged and discharged and be useful as a car-mounted battery, for example. Examples of the shape of a lithium solid state battery of the first embodiment include a coin shape, a laminate shape, a cylindrical shape and a rectangular shape.

A producing method for a lithium solid state battery of the first embodiment is not particularly limited if it is a method for obtaining the above-mentioned lithium solid state battery, and the same method as a producing method for a general lithium solid state battery may be used. Examples of a producing method for a lithium solid state battery include a method such that a material composing a cathode active material layer, a material composing a solid electrolyte layer and a material composing an anode active material layer are sequentially pressed to thereby produce a power generating element and this power generating element is stored inside a battery case, which is swaged.

2. Second Embodiment

Next, a second embodiment of a lithium solid state battery of the present invention is described. The lithium solid state battery of the second embodiment is a lithium solid state battery comprising a cathode active material layer containing a cathode active material, an anode active material layer containing an anode active material, and a solid electrolyte layer formed between the cathode active material layer and the anode active material layer, characterized in that at least one of the cathode active material layer, the anode active material layer and the solid electrolyte layer contains the above-mentioned sulfide solid electrolyte material.

The second embodiment allows a high-output lithium solid state battery by reason of containing a sulfide solid electrolyte material comprising LiI (LiI component). In addition, the sulfide solid electrolyte material may restrain chemical stability from deteriorating due to the influence of LiI by reason of containing an ion conductor containing oxygen (O). As a result, the second embodiment allows a lithium solid state battery which restrains reaction resistance from increasing.

The lithium solid state battery of the second embodiment, similarly to the above-mentioned FIG. 1, comprises a cathode active material layer 1 containing a cathode active material, an anode active material layer 2 containing an anode active material, a solid electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. The second embodiment is greatly characterized in that at least one of the cathode active material layer 1, the anode active material layer 2 and the solid electrolyte layer 3 contains the sulfide solid electrolyte material described in the above-mentioned "A. Sulfide solid electrolyte material 2. Second embodiment". In particular, in the second embodiment, the cathode active material layer 1, the anode active material layer 2 and the solid electrolyte layer 3 preferably contain the above-mentioned sulfide solid electrolyte material.

In the second embodiment, at least the cathode active material layer 1 preferably contains the above-mentioned sulfide solid electrolyte material. As described above, the reason therefor is that conventionally a sulfide solid electrolyte material comprising LiI has not been used for the cathode active material layer. In addition, in the second embodiment, the electric potential of a cathode active material is not particularly limited and is preferably 2.8 V (vs Li) or more, for example. Other items with regard to a lithium solid state battery of the second embodiment are the same as the items described in the above-mentioned "B. Lithium solid state battery 1. First embodiment"; therefore, the description will not be repeated here.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1-1

Lithium sulfide ($Li_2S$), diphosphorus pentasulfide ($P_2S_5$) and lithium iodide (LiI) were used as a starting material. Next, $Li_2S$ and $P_2S_5$ were weighed in a glove box under an Ar atmosphere (a dew point of −70° C.) so as to become a molar ratio of $75Li_2S \cdot 25P_2S_5$ ($Li_3PS_4$, ortho-composition). Next, LiI was weighed so as to become 10 mol %. Projected into a vessel of planetary ball mill (45 cc, made of $ZrO_2$) was 2 g of this mixture, dehydrated heptane (a moisture amount of 30 ppm or less, 4 g) was projected thereinto, and $ZrO_2$ ball (φ=5 mm, 53 g) was projected thereinto to completely seal the vessel (an Ar atmosphere). This vessel was mounted on a planetary ball milling machine (P7™ manufactured by Fritsch Japan Co., Ltd.) to perform mechanical milling of 1-hour treatment and 15-minute intermission 40 times at the number of weighing table revolutions of 500 rpm. Thereafter, the obtained sample was dried on a hotplate so as to remove heptane to obtain a sulfide solid electrolyte material. The composition of the obtained sulfide solid electrolyte material was $10LiI \cdot 90$ ($0.75Li_2S \cdot 0.25P_2S_5$).

Example 1-2

A sulfide solid electrolyte material was obtained in the same manner as Example 1-1 except for modifying the ratio of LiI into 30 mol %. The composition of the obtained sulfide solid electrolyte material was $30LiI \cdot 70$ ($0.75Li_2S \cdot 0.25P_2S_5$).

Comparative Example 1-1, 1-2

A sulfide solid electrolyte material was each obtained in the same manner as Example 1-1 except for modifying the ratio of LiI into 35 mol % and 40 mol %. The composition of the obtained sulfide solid electrolyte material was each $35LiI \cdot 65$ ($0.75Li_2S \cdot 0.25P_2S_5$) and $40LiI \cdot 60$ ($0.75Li_2S \cdot 0.25P_2S_5$).

Comparative Example 1-3

An $Li_2S$—$P_2S_5$—LiI-based amorphous material described in Non Patent Literature 1 was reproduced as strictly as possible. In Non Patent Literature 1, wet-type mechanical milling was not described at all and an ordinary dry-type mechanical milling was adopted. First, lithium sulfide ($Li_2S$), diphosphorus pentasulfide ($P_2S_5$) and lithium iodide (LiI) were used as a starting material. Next, $Li_2S$ and $P_2S_5$ were weighed in a glove box under an Ar atmosphere (a dew point of −70° C.) so as to become a molar ratio of $75Li_2S \cdot 25P_2S_5$ ($Li_3PS_4$, ortho-composition). Next, LiI was weighed so as to become 30 mol %. Projected into a vessel of planetary ball mill (45 cc, made of $ZrO_2$) was 1 g of this mixture, and $ZrO_2$ ball (φ=10 mm, 10 pieces) was projected thereinto to completely seal the vessel (an Ar atmosphere). This vessel was mounted on a planetary ball milling machine (P7™ manufactured by Fritsch Japan Co., Ltd.) to perform mechanical milling of 1-hour treatment and 15-minute intermission 40 times at the number of weighing table revolutions of 370 rpm. Thus, a sulfide solid electrolyte material was obtained. The composition of the obtained sulfide solid electrolyte material was $30LiI \cdot 70$ ($0.75Li_2S \cdot 0.25P_2S_5$).

Figure 2A:
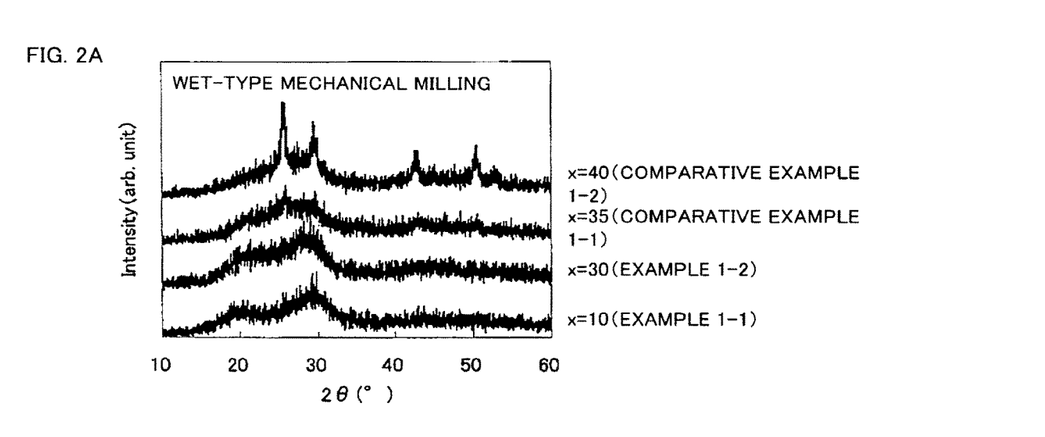
FIGS. 2A and 2B are each a result of measuring X-ray diffraction for a sulfide solid electrolyte material obtained in Example 1-1, 1-2 and Comparative Example 1-1 to 1-3.
Figure 2B:
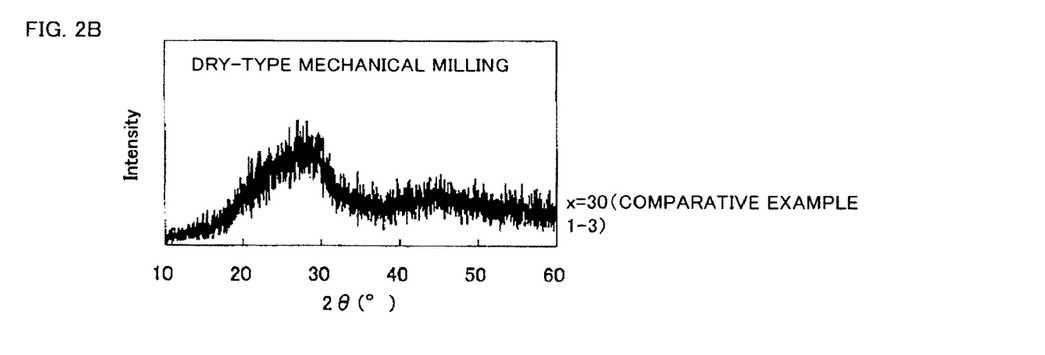

[Evaluation 1]
(X-Ray Diffraction Measurement)
X-ray diffraction (XRD) measurement using a CuKα ray was performed for the sulfide solid electrolyte material obtained in Example 1-1, 1-2 and Comparative Example 1-1 to 1-3. RINT UltimaIII™ manufactured by Rigaku Corporation was used for XRD measurement. The results are shown in FIGS. 2A and 2B. As shown in FIG. 2A, in Example 1-1, 1-2, a halo pattern was obtained and it was confirmed that the material was an amorphous substance. On the other hand, in Comparative Example 1-2, a peak of LiI was confirmed in the vicinity of 2θ=26° and the material was not an amorphous substance. In Comparative Example 1-1, a peak of LiI was slightly observed in the vicinity of 2θ=26° and it was determined that the material was not an amorphous substance. On the other hand, as shown in FIG. 2B, in Comparative Example 1-3, a halo pattern was obtained and it was confirmed that the material was an amorphous substance.

Figure 3:
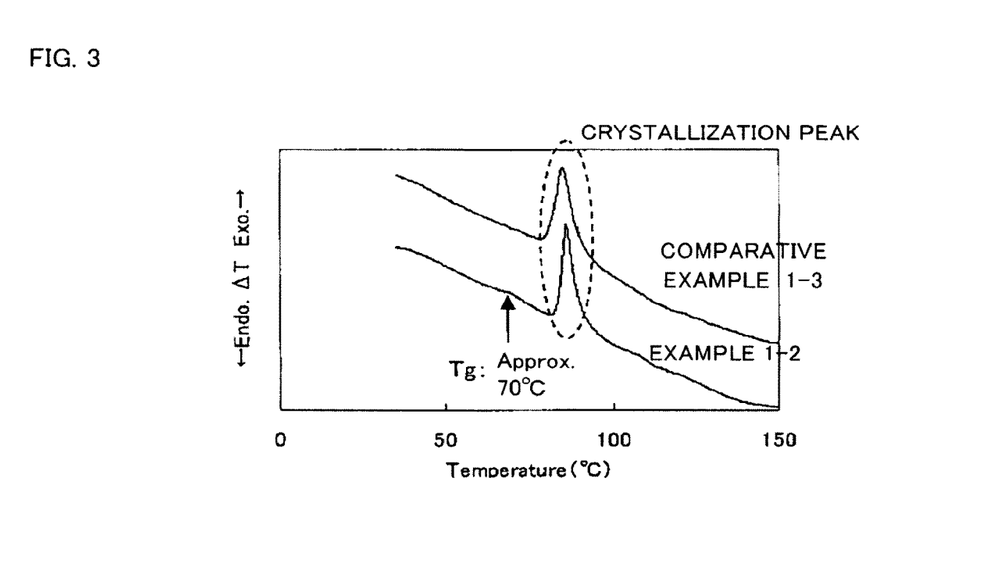
FIG. 3 is a result of differential thermal analysis for a sulfide solid electrolyte material obtained in Example 1-2 and Comparative Example 1-3.

(Differential Thermal Analysis)
Differential thermal analysis (DTA) was performed for the sulfide solid electrolyte material obtained in Example 1-2 and Comparative Example 1-3. TGA/SDTA851e™ manufactured by Mettler-Toledo International Inc. was used for DTA. The results are shown in FIG. 3. As shown in FIG. 3, in Example 1-2, glass transition was confirmed at a temperature of approximately 70° C. On the contrary, in Comparative Example 1-3, definite glass transition was not confirmed. The sulfide solid electrolyte material obtained in Example 1-2 was glass in the strict sense by reason of being an amorphous substance as shown in FIG. 2A and having a glass transition point as shown in FIG. 3. On the contrary, in Comparative Example 1-3, the material was an amorphous substance but not glass in the strict sense. In Example 1-2, it is conceived that the use of wet-type mechanical milling allows a raw material composition to be prevented from anchoring on a wall surface of the vessel and allows a sulfide solid electrolyte material with higher amorphous nature to be obtained. In comparison of crystallization behavior, Example 1-2 using wet-type mechanical milling was so sharper in peak than Comparative Example 1-3 using dry-type mechanical milling that it was suggested that a molecular structure was more uniform.

(Li Ion Conductivity Measurement)

Figure 4:
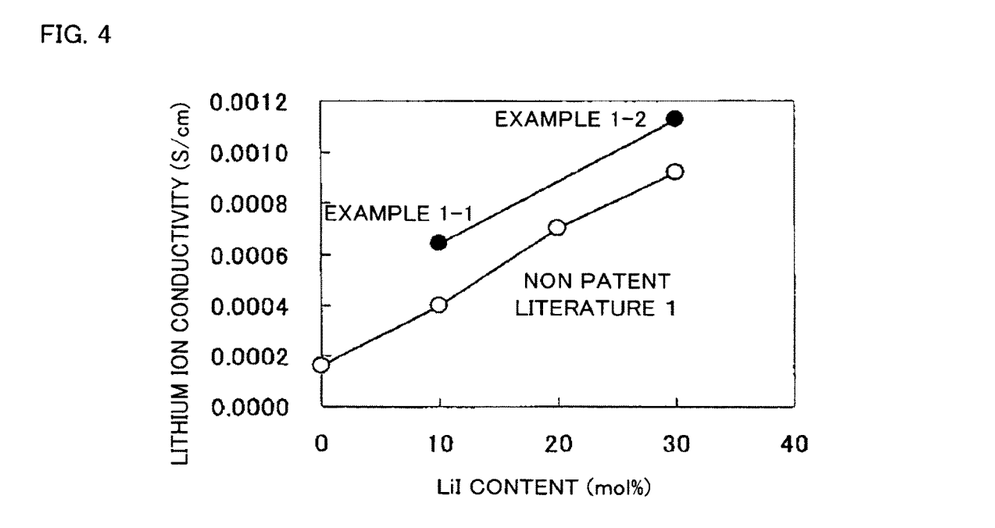
FIG. 4 is a result of measuring Li ion conductivity for a sulfide solid electrolyte material obtained in Example 1-1, 1-2.

Li ion conductivity (room temperature) measurement by an alternating current impedance method was performed for the sulfide solid electrolyte material obtained in Example 1-1, 1-2. Li ion conductivity measurement was as follows. A sample of 100 mg added to a support tube (made of Macor) was held by electrodes made of SKD. Thereafter, the sample was pressed into powder at a pressure of 4.3 ton/cm$^2$ to perform impedance measurement while constraining the sample at 6 Ncm. Solartron 1260™ was used for the measurement and the measurement conditions were an impressed voltage of 5 mV and a measuring frequency band of 0.01 MHz to 1 MHz. The results are shown in FIG. 4. The results of FIG. 2 of Non Patent Literature 1 were also shown in FIG. 4. As shown in FIG. 4, it was confirmed that the sulfide solid electrolyte material obtained in Example 1-1, 1-2 was higher in Li ion conductivity than the sulfide solid electrolyte material described in Non Patent Literature 1.

(Raman Spectroscopy Measurement)

Figure 5:
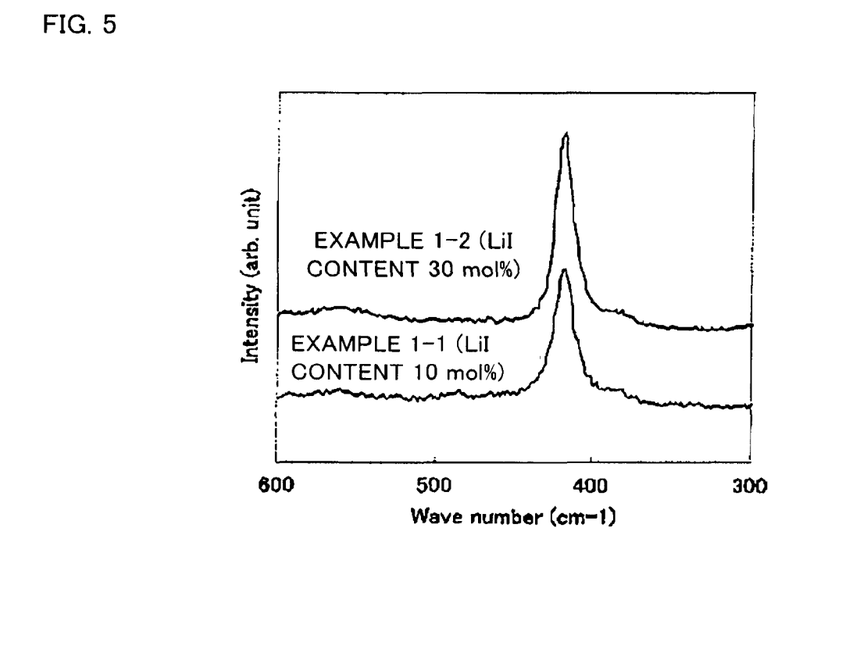
FIG. 5 is a result of measuring Raman spectroscopy for a sulfide solid electrolyte material obtained in Example 1-1, 1-2.

Raman spectroscopy measurement was performed for the sulfide solid electrolyte material obtained in Example 1-1, 1-2. Nanofinder SOLAR T II™ manufactured by Tokyo Instruments, Inc. was used for Raman spectroscopy measurement. The results are shown in FIG. 5. As shown in FIG. 5, it was confirmed that the sulfide solid electrolyte material obtained in Example 1-1, 1-2 had a peak of a $PS_4^{3-}$ structure in the vicinity of 420 cm$^{-1}$. The material did not have a peak of a $P_2S_7^{4-}$ structure containing cross-linking sulfur (in the vicinity of 410 cm$^{-1}$).

(Verification of Oxidative Decomposition)

Figure 6:
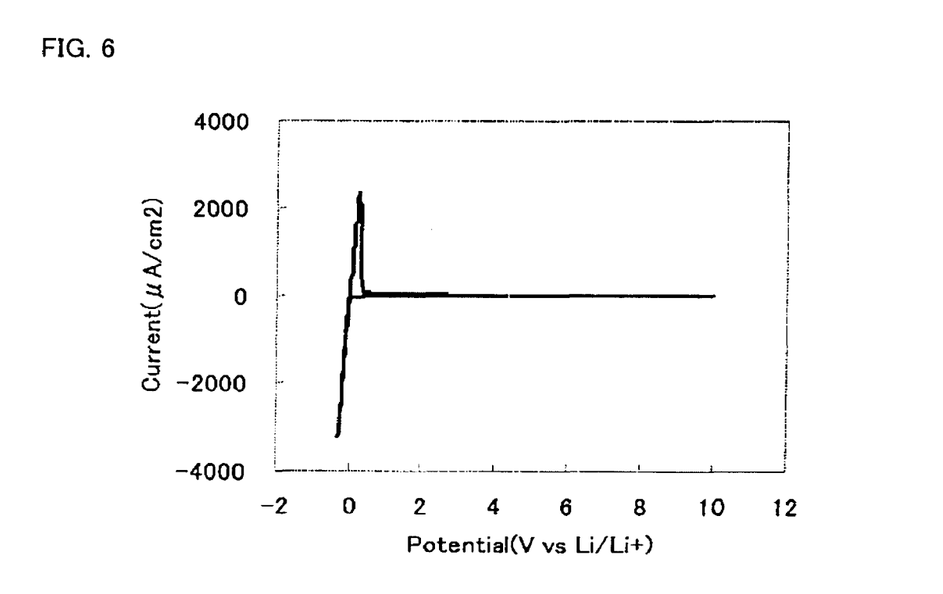
FIG. 6 is a result of measuring cyclic voltammetry for a sulfide solid electrolyte material obtained in Example 1-2.

Cyclic voltammetry (CV) was performed for the sulfide solid electrolyte material (30LiI.70 (0.75Li$_2$S.0.25P$_2$S$_5$)) obtained in Example 1-2. A cell composed of Li/sulfide solid electrolyte material/SUS was prepared as an evaluation cell. This evaluation cell was a cell with a bipolar constitution such that Li was used for a reference electrode and a counter electrode and SUS was used for a working electrode. The potential scanning speed was 5 mV/s and the potential range was −0.3 V to 10 V. The results are shown in FIG. 6. As shown in FIG. 6, oxidation-reduction current corresponding to dissolution precipitation of Li was confirmed but oxidative decomposition reaction of LiI was not confirmed. Thus, in the case where an ion conductor with an ortho-composition was doped with LiI, it was confirmed that oxidative decomposition of LiI was not caused.

With regard to a conventional amorphous sulfide solid electrolyte material, a synthesis method was only melt extraction, so that it was difficult to synthesize a sulfide solid electrolyte material with an ortho-composition. Through the view that decomposition potential of LiI is 2.7 V thermodynamically and bonding of an amorphous substance is firm, conventionally it has been widely conceived that LiI may not be used for a battery using a cathode active material with high electric potential by reason of being subject to oxidative decomposition. In recent years, mechanical milling is established as a new amorphizing method and a sulfide solid electrolyte material with an ortho-composition (an amorphous substance) may be synthesized, but it has been widely conceived that LiI is subject to oxidative decomposition, so that an ion conductor with an ortho-composition has not been doped with LiI. However, as described above, in the case where an ion conductor with an ortho-composition was doped with LiI, new knowledge that oxidative decomposition of LiI was not caused was found out.

Example 2

The sulfide solid electrolyte material (30LiI.70 (0.75Li$_2$S.0.25P$_2$S$_5$)) obtained in Example 1-2 and LiCoO$_2$ (a cathode active material) coated with LiNbO$_3$ with a thickness of 7 nm were mixed at a weight ratio of cathode active material:sulfide solid electrolyte material=7:3 to obtain a cathode composite. Next, the sulfide solid electrolyte material obtained in Example 1-2 and graphite (an anode active material) were mixed at a weight ratio of anode active material:sulfide solid electrolyte material=5:5 to obtain an anode composite. Next, the sulfide solid electrolyte material obtained in Example 1-2 was prepared as a solid electrolyte layer-forming material. Projected into a cylinder were 16.2 mg of the cathode composite, 65 mg of the solid electrolyte layer-forming material and 12 mg of the anode composite to perform cold pressing at a pressure of 4.3 ton/cm$^2$ and obtain a lithium solid state battery.

Comparative Example 2

First, a sulfide solid electrolyte material was obtained in the same manner as Comparative Example 1-3 except for modifying the ratio of Li$_2$S and P$_2$S$_5$ into a molar ratio of 67Li$_2$S.33P$_2$S$_5$ (dry-type mechanical milling). The composition of the obtained sulfide solid electrolyte material was 30LiI.70 (0.67Li$_2$S.0.33P$_2$S$_5$).

Next, a lithium solid state battery was obtained in the same manner as Example 2 except for modifying the cathode composite, the anode composite and the sulfide solid electrolyte material used for the solid electrolyte layer-forming material into the sulfide solid electrolyte material obtained above (30LiI.70 (0.67Li$_2$S.0.33P$_2$S$_5$)).

[Evaluation 2]

(Evaluation of Charge-Discharge Cycle Characteristics)

Figure 7:
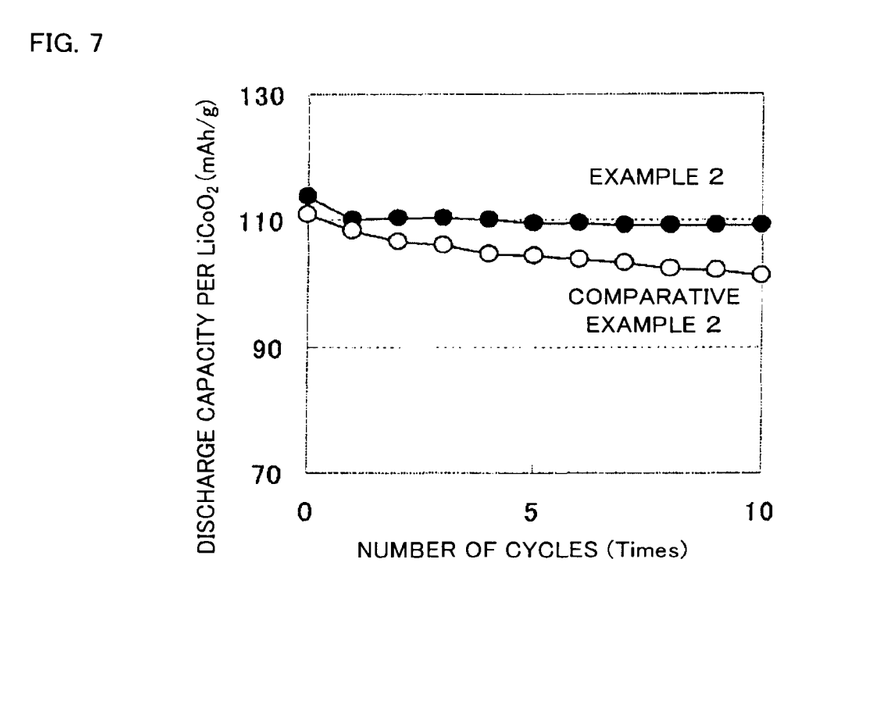
FIG. 7 is a result of evaluating charge-discharge cycle characteristics for a lithium solid state battery obtained in Example 2 and Comparative Example 2.

The evaluation of charge-discharge cycle characteristics was performed by using the lithium solid state battery obtained in Example 2 and Comparative Example 2. The constant-current charge-discharge measurement was performed in a range of 3 V to 4.1 V for the lithium solid state battery. The charge-discharge rate was 0.1 C and the temperature was 25° C. The results are shown in FIG. 7. As shown in FIG. 7, it was confirmed that Example 2 was smaller in decrease of discharge capacity than Comparative Example 2 even though charge and discharge were repeated. As Comparative Example 2, in the case of using the sulfide solid electrolyte material containing cross-linking sulfur, it is conceived that the decrease of discharge capacity became large for the reason that the sulfide solid electrolyte material was subject to oxidative decomposition. On the contrary, as Example 2, in the case of using the sulfide solid electrolyte material containing no cross-linking sulfur, it is conceived that discharge capacity may maintain high value for the reason that the sulfide solid electrolyte material was not subject to oxidative decomposition.

(Reaction Resistance Measurement)

Figure 8:
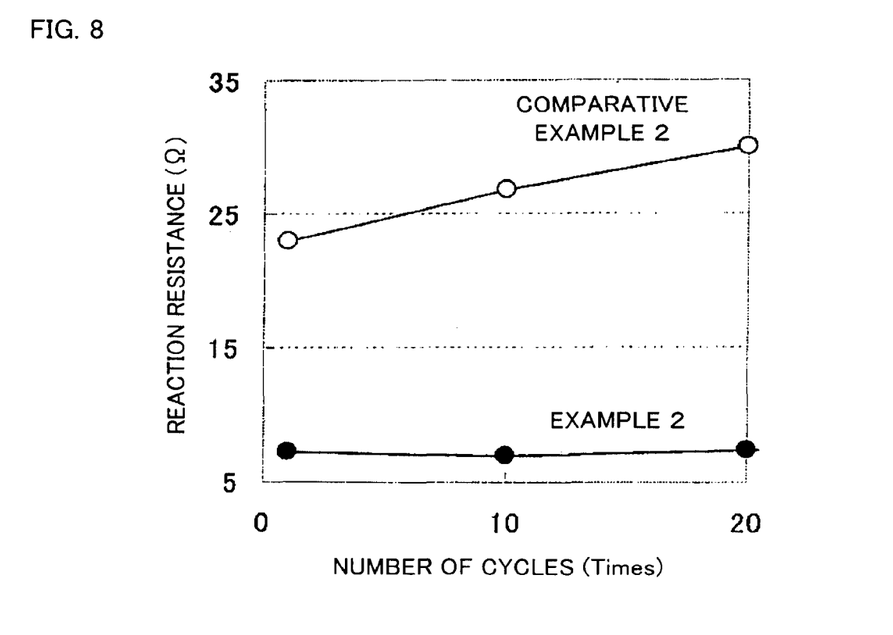
FIG. 8 is a result of evaluating reaction resistance measurement for a lithium solid state battery obtained in Example 2 and Comparative Example 2.

Reaction resistance measurement was performed by using the lithium solid state batteries obtained in Example 2 and Comparative Example 2. After adjusting the electric potential of the lithium solid state batteries to 3.96 V, reaction resistance of the batteries was calculated by performing complex impedance measurement. Reaction resistance was calculated from a diameter of a circular arc of the impedance curve. The results are shown in FIG. 8. As shown in FIG. 8, it was confirmed that Example 2 was greatly smaller in reaction resistance than Comparative Example 2. As Comparative Example 2, in the case of using the sulfide solid electrolyte material containing cross-linking sulfur, it is conceived that reaction resistance became large for the reason that the sulfide solid electrolyte material was subject to oxidative decomposition. On the contrary, as Example 2, in the case of using the sulfide solid electrolyte material containing no cross-linking sulfur, it is conceived that the increase of reaction resistance was not caused for the reason that the sulfide solid electrolyte material was not subject to oxidative decomposition. Through the results of the above-mentioned verification of oxidative decomposition, evaluation of charge-discharge cycle characteristics and reaction resistance measurement, it was suggested that decomposition of LiI concerned conventionally was not caused but decomposition of cross-linking sulfur was caused actually.

Example 3-1

First, lithium sulfide ($Li_2S$), lithium oxide ($Li_2O$), diphosphorus pentasulfide ($P_2S_5$) and lithium iodide (LiI) were used as a starting material. Next, $Li_2S$, $P_2S_5$ and LiI were weighed by predetermined amount in a glove box under an Ar atmosphere (a dew point of −70° C.). Projected into a vessel of planetary ball mill (45 cc, made of $ZrO_2$) was 2 g of this mixture, dehydrated heptane (a moisture amount of 30 ppm or less, 4 g) was projected thereinto, and $ZrO_2$ ball (φ=5 mm, 53 g) was projected thereinto to completely seal the vessel (an Ar atmosphere). This vessel was mounted on a planetary ball milling machine (P7™ manufactured by Fritsch Japan Co., Ltd.) to perform mechanical milling of 1-hour treatment and 15-minute intermission 20 times at the number of weighing table revolutions of 370 rpm. Next, $Li_2O$ was added to the obtained sample by predetermined amount to perform mechanical milling again on the same conditions. Thereafter, the obtained sample was dried on a hotplate so as to remove heptane to obtain a sulfide solid electrolyte material. The composition of the obtained sulfide solid electrolyte material was 30LiI.70 ($0.69Li_2S.0.06Li_2O.0.25P_2S_5$).

Example 3-2 to 3-6

A sulfide solid electrolyte material was each obtained in the same manner as Example 3-1 except for modifying the ratio of LiI into x=10, 20, 40, 43, 60 in xLiI.(100−x)($0.69Li_2S.0.06Li_2O.0.25P_2S_5$).

Comparative Example 3-1

A sulfide solid electrolyte material was obtained in the same manner as Example 3-1 except for weighing $Li_2S$ and $P_2S_5$ at a molar ratio of $75Li_2S.25P_2S_5$ (ortho-composition) without using $Li_2O$ and LiI. The composition of the obtained sulfide solid electrolyte material was $75Li_2S.25P_2S_5$.

Comparative Example 3-2

First, lithium sulfide ($Li_2S$), lithium oxide ($Li_2O$) and diphosphorus pentasulfide ($P_2S_5$) were used as a starting material. Next, $Li_2S$ and $P_2S_5$ were weighed in a glove box under an Ar atmosphere (a dew point of −70° C.) so as to become a molar ratio of $69Li_2S.25P_2S_5$. Projected into a vessel of planetary ball mill (45 cc, made of $ZrO_2$) was 2 g of this mixture, dehydrated heptane (a moisture amount of 30 ppm or less, 4 g) was projected thereinto, and $ZrO_2$ ball (φ=5 mm, 53 g) was projected thereinto to completely seal the vessel (an Ar atmosphere). This vessel was mounted on a planetary ball milling machine (P7™ manufactured by Fritsch Japan Co., Ltd.) to perform mechanical milling of 1-hour treatment and 15-minute intermission 20 times at the number of weighing table revolutions of 500 rpm. $Li_2O$ was added to the obtained sample so as to become 6 mol % to perform mechanical milling again on the same conditions. Thereafter, the obtained sample was dried on a hotplate so as to remove heptane to obtain a sulfide solid electrolyte material. The composition of the obtained sulfide solid electrolyte material was $69Li_2S.6Li_2O.25P_2S_5$.

Example 4

A lithium solid state battery was obtained in the same manner as Example 2 except for modifying the cathode composite, the anode composite and the sulfide solid electrolyte material used for the solid electrolyte layer-forming material into the sulfide solid electrolyte material obtained in Example 3-1 (30LiI.70 ($0.69Li_2S.0.06Li_2O.0.25P_2S_5$)).

Comparative Example 4-1, 4-2

A lithium solid state battery was each obtained in the same manner as Example 4 except for modifying the cathode composite, the anode composite and the sulfide solid electrolyte material used for the solid electrolyte layer-forming material into the sulfide solid electrolyte material obtained in Comparative Example 3-1 ($75Li_2S.25P_2S_5$) and the sulfide solid electrolyte material obtained in Comparative Example 3-2 ($69Li_2S.6Li_2O.25P_2S_5$).

Reference Example 4

A lithium solid state battery was obtained in the same manner as Example 4 except for modifying the cathode composite, the anode composite and the sulfide solid electrolyte material used for the solid electrolyte layer-forming material into the sulfide solid electrolyte material obtained in Example 1-2 (30LiI.70 ($0.75Li_2S.0.25P_2S_5$)).

[Evaluation 3]
(Li Ion Conductivity Measurement)

Figure 9:
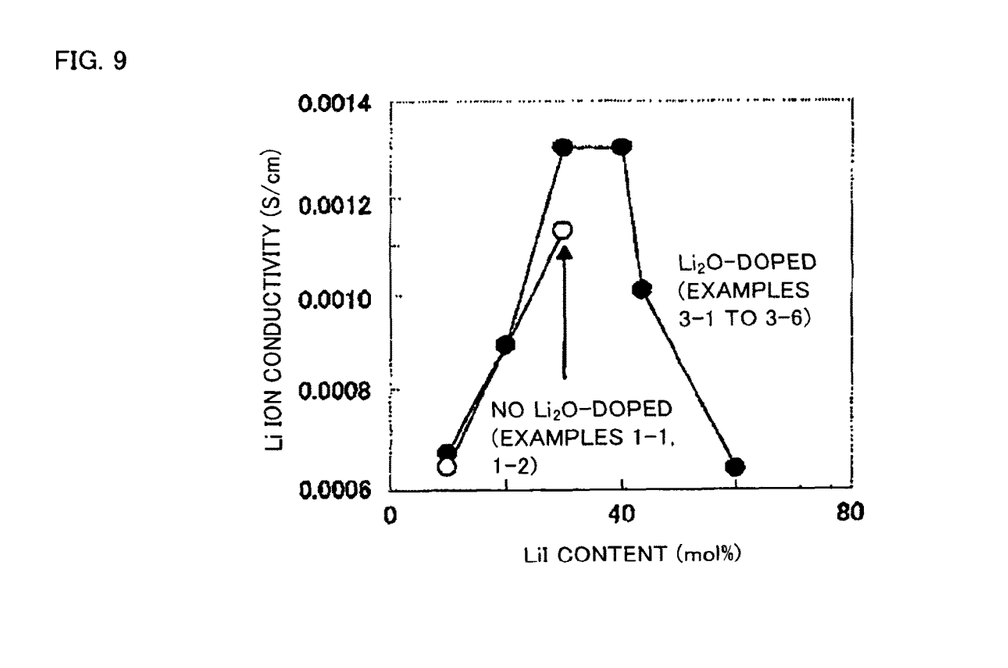
FIG. 9 is a result of measuring Li ion conductivity for a sulfide solid electrolyte material obtained in Example 3-1 to 3-6.

Li ion conductivity (room temperature) measurement by an alternating current impedance method was performed for the sulfide solid electrolyte material obtained in Example 3-1 to 3-6. The measuring method is the same as the above. The results are shown in FIG. 9. For reference, the results of the sulfide solid electrolyte material obtained in Example 1-1, 1-2 are also shown in FIG. 9. As shown in FIG. 9, it was confirmed that Example 3-1 to 3-6 in which both LiI and $Li_2O$ were doped were higher in Li ion conductivity than Example 1-1, 1-2 in which only LiI was doped. The reason why Li ion conductivity was improved by doping both LiI and Li$_2$O is still unclear and is conceived to be a possibility of causing mixed anion effect (the effect of improving conductivity by mixing anions of different kinds).

(Reaction Resistance Measurement)

Figure 10:
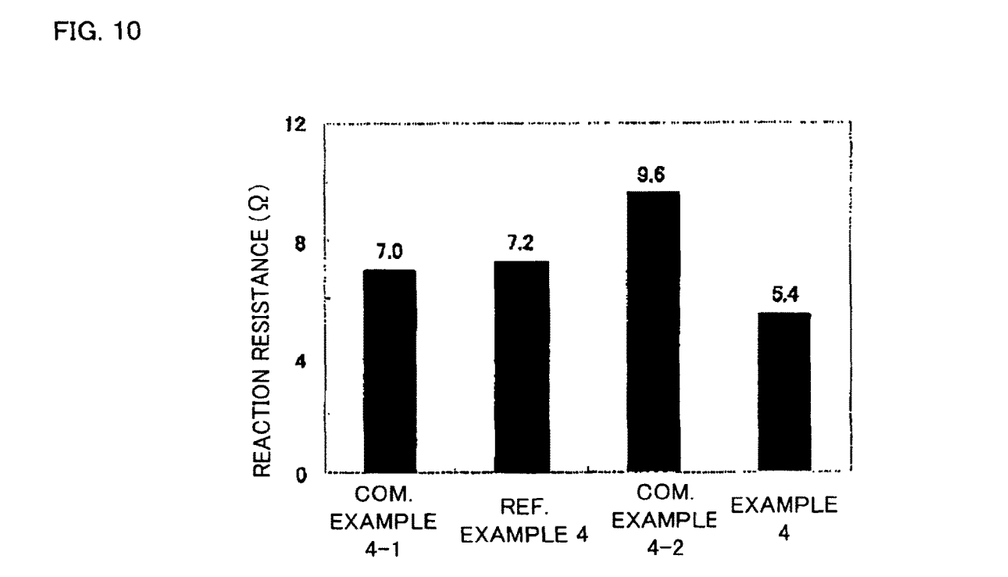
FIG. 10 is a result of evaluating reaction resistance measurement for a lithium solid state battery obtained in Example 4, Comparative Example 4-1, 4-2 and Reference Example 4.

Reaction resistance measurement was performed by using the lithium solid state batteries obtained in Example 4, Comparative Example 4-1, 4-2 and Reference Example 4. The method for reaction resistance measurement is the same as the above-mentioned contents. The results are shown in FIG. 10. As shown in FIG. 10, in Reference Example 4, reaction resistance increased somewhat as compared with Comparative Example 4-1. The reason therefor is conceived to be a possibility that chemical stability of the sulfide solid electrolyte material deteriorated due to the doping of LiI in consideration of doping LiI in Reference Example 4 as compared with Comparative Example 4-1. In Comparative Example 4-2, reaction resistance increased as compared with Comparative Example 4-1. The reason therefor is conceived to be a possibility that Li ion conductivity of the sulfide solid electrolyte material deteriorated due to the doping of Li$_2$O in consideration of doping Li$_2$O in Comparative Example 4-2.

On the contrary, in Example 4, reaction resistance decreased greatly as compared with Comparative Example 4-1. This is considered as follows. That is to say, the reason therefor is conceived to be that the doping of LiI improved Li ion conductivity of the sulfide solid electrolyte material to restrain the defect of the doping of Li$_2$O (the deterioration of Li ion conductivity), and the doping of Li$_2$O improved chemical stability of the sulfide solid electrolyte material to restrain the defect of the doping of LiI (the deterioration of chemical stability). That is, it is conceived that the doping of both LiI and Li$_2$O caused the synergistic effect of complementing mutual defects.

REFERENCE SIGNS LIST

1 . . . cathode active material layer
2 . . . anode active material layer
3 . . . solid electrolyte layer
4 . . . cathode current collector
5 . . . anode current collector
6 . . . battery case
10 . . . lithium solid state battery

The invention claimed is:

1. A sulfide solid electrolyte material comprising an ion conductor having an anion structure of an ortho-composition with a ratio of 70 mol % or more to all anion structures, and LiI,
   wherein the ion conductor contains oxygen, and
   the sulfide solid electrolyte material contains substantially no Li$_2$S and cross-linking sulfur, and
   the sulfide solid electrolyte material does not have a peak of Li$_2$S in an XRD measurement using a Cuk$\alpha$ ray.

2. The sulfide solid electrolyte material according to claim 1, wherein the ion conductor contains Li, X (X is P, Si, Ge, Al or B), S, and O.

3. The sulfide solid electrolyte material according to claim 1, wherein the ion conductor contains Li, P, S, and O.

4. A lithium solid state battery comprising a cathode active material layer containing a cathode active material, an anode active material layer containing an anode active material, and a solid electrolyte layer formed between the cathode active material layer and the anode active material layer,
   wherein at least one of the cathode active material layer, the anode active material layer and the solid electrolyte layer contains the sulfide solid electrolyte material according to claim 1.

5. The lithium solid state battery according to claim 4, wherein the cathode active material layer contains the cathode active material with an electric potential of 2.8 V (vs Li) or more, and the sulfide solid electrolyte material.

* * * * *